United States Patent
Batai et al.

(10) Patent No.: US 10,104,746 B2
(45) Date of Patent: *Oct. 16, 2018

(54) WIRELESS CONNECTION OF SENSORS TO OUTDOOR LIGHTING SYSTEM

(71) Applicant: General Electric Company, Schenectady, NY (US)

(72) Inventors: Roland Batai, Budapest (HU); Gleb Geguine, Lachine (CA); Francois Giguere, Lachine (CA)

(73) Assignee: General Electric Company, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/660,150

(22) Filed: Jul. 26, 2017

(65) Prior Publication Data

US 2017/0325317 A1 Nov. 9, 2017

Related U.S. Application Data

(63) Continuation of application No. 15/146,927, filed on May 5, 2016, now Pat. No. 9,750,110.

(51) Int. Cl.
*H05B 37/02* (2006.01)
*F21S 8/08* (2006.01)
*H05B 33/08* (2006.01)

(52) U.S. Cl.
CPC .......... *H05B 37/0218* (2013.01); *F21S 8/086* (2013.01); *H05B 37/0272* (2013.01); *H05B 33/0854* (2013.01)

(58) Field of Classification Search
CPC .................................................. H05B 33/0854
USPC .................................................. 315/149, 308
See application file for complete search history.

(56) References Cited

U.S. PATENT DOCUMENTS

| 8,476,565 B2* | 7/2013 | Verfuerth | ........... H05B 37/0272 250/205 |
| 8,921,751 B2* | 12/2014 | Verfuerth | ........... H05B 37/0272 250/205 |
| 2015/0216019 A1* | 7/2015 | Verfuerth | ........... H05B 37/0272 315/153 |

\* cited by examiner

*Primary Examiner* — Thuy Vinh Tran
(74) *Attorney, Agent, or Firm* — Peter T. DiMauro; GPO Global Patent Operation

(57) ABSTRACT

Provided is a sensor system for an outdoor lighting system including at least one sensor physically connected with an external connector of a lighting fixture of the outdoor lighting system. The sensor performs sensing and wireless data and power connection, via a wireless power source and a wireless data source, with the outdoor lighting system.

12 Claims, 7 Drawing Sheets

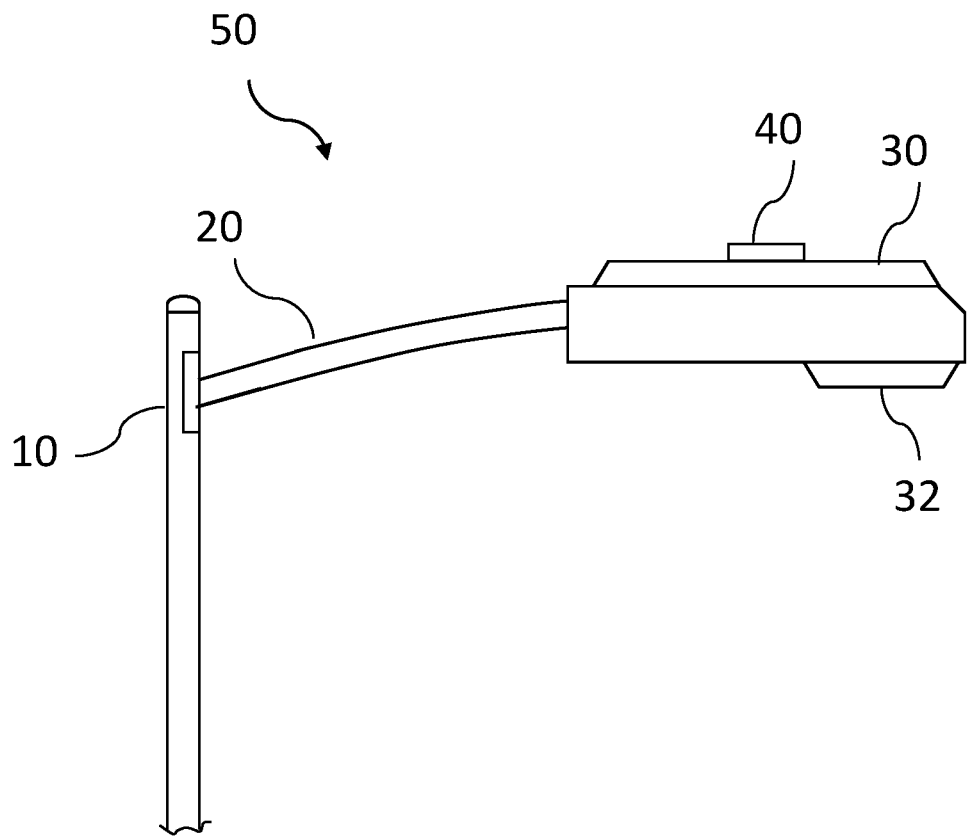
FIG. 1
(Conventional)

WIRELESS CONNECTION OF SENSORS TO OUTDOOR LIGHTING SYSTEM

I. RELATED APPLICATIONS

This application is a continuation under 37 CFR 1.53 of commonly-owned U.S. application Ser. No. 15/146,927, filed May 5, 2016, which is now U.S. Pat. No. 9,750,110 B1, which is hereby incorporated by reference in its entirety.

II. TECHNICAL FIELD

The present invention relates generally to outdoor lighting systems. In particular, the present invention relates to a wireless connection of sensors to a lighting fixture of an outdoor lighting system.

III. BACKGROUND

An outdoor lighting system, such as a roadway/outdoor lighting system, includes one or more lighting fixtures, each fixture typically providing illumination to surroundings within close proximity thereof. The lighting fixtures can be found along the streets and street corners, and at roadway intersections. The lighting fixtures also provide visibility during nighttime hours for security and safety purposes.

The lighting fixtures are disposed near roadway intersections to enable pedestrian traffic and vehicle traffic to safely navigate the roadway after hours and in low lit areas.

The lighting fixtures are typically mounted on street poles as shown in FIG. 1. FIG. 1 includes a roadway outdoor lighting system 50, including a pole 10, a mast arm 20 connected to the pole 10 at a proximal end. Also, included is a lighting fixture 30 physically coupled to a distal and of the mast arm 20. The roadway outdoor lighting system 50 is typically disposed in the ground at a bottom of the pole 10.

The mast arm 20 includes electrical wiring for connecting and energizing the lighting fixture via a utility grid. The lighting fixture 30 typically includes a lighting device 32 and a connector 40 (e.g., a NEMA® socket) at a top surface thereof for connecting to a photocell. The photocell is mounted on the lighting fixture 30 for automatic activation of light from the lighting fixture during reduced lighting conditions.

The poles of the roadway/street lighting systems are increasingly being used to perform other functions, in addition to providing lighting. Thus, non-lighting related devices (e.g., cameras) are being mounted to the poles to collect information such as traffic and weather conditions to monitor and improve traffic flow The addition of non-lighting related devices can cause problems with altering the components within the pole and the mast arm. This is especially true when creating power and data connections between these devices and the pole and/or the lighting device. In these instances, the integrity of the structure of the roadway outdoor lighting system can be compromised.

IV. SUMMARY OF THE EMBODIMENTS

Given the aforementioned deficiencies, a need exists for more adaptable wireless connections of sensor systems to outdoor lighting (e.g., outdoor lighting) systems.

Embodiments of the present invention provide a sensor system for an outdoor lighting system including a lighting fixture and an external connector. The sensor system includes at least one sensor physically connected with the external connector and performs sensing, and performs wireless data and power connection, via a wireless power source and a wireless data source, with the outdoor lighting system.

In another exemplary embodiment, a sensor system for an outdoor lighting system is provided. The outdoor lighting system includes a lighting fixture and one or more inductive coupled latches. The sensor system includes at least one sensor mounted to a respective inductive coupled latch disposed on the lighting fixture, and configured to wirelessly receive data and power from the outdoor lighting system, by wireless power transfer operation of the respective inductive coupled latch.

In another exemplary embodiment, a sensor system for an outdoor lighting system including a lighting fixture attached to a pole via a mast arm is provided. The sensor system includes at least one sensor physically mounted to the pole, and a wireless source connector connected to the lighting fixture. The at least one sensor performs sensing, and performs wireless data and power connection, via the wireless source connector, with the outdoor lighting system.

In yet another exemplary embodiment, a method for performing wireless connection of a sensor system to an outdoor lighting system having a lighting fixture is provided. The method includes connecting at least one sensor of the sensor system via at least one of (i) direct coupling and (ii) inductive coupling, to the lighting fixture, and wirelessly connecting the sensor system to the outdoor lighting system to receive data and power from the outdoor lighting system.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

V. DESCRIPTION OF THE DRAWINGS

FIG. 1 is a schematic illustrating a conventional outdoor lighting system.

Figure 2:
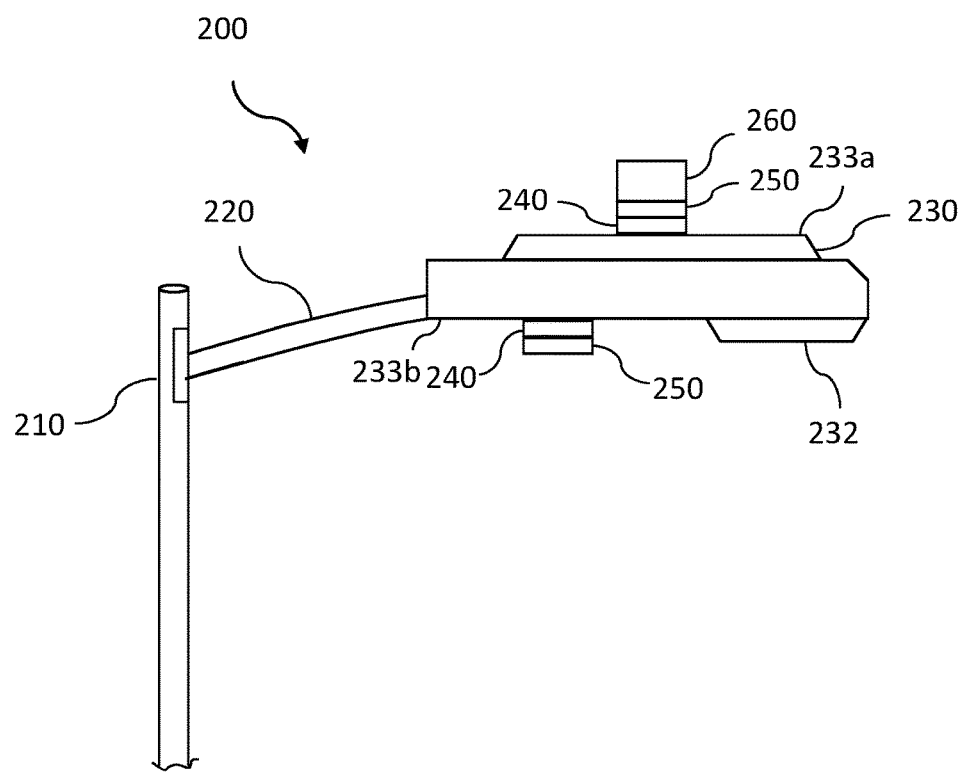
FIG. 2 is a schematic illustrating the wireless connection of a sensor system to an outdoor lighting system that can be implemented within one or more embodiments.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

VI. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Embodiments of the present invention provide a sensor system that can be wirelessly connected to an outdoor lighting system without using direct electrical contact. The sensor system receives both power and data from the lighting fixture of the outdoor lighting system. The sensor system can be implemented within existing outdoor lighting systems and provides sensing capabilities for sensing environmental conditions, traffic conditions and for controlling of the lighting device of the outdoor lighting system.

As shown in FIG. 2, the outdoor lighting system 200 includes a pole 210 attached to a proximal end of of a mast arm 220 and a lighting fixture 230 attached to a distal end of the mast arm 220. The lighting fixture 230 includes a lighting device 232 facing downwardly for illuminating a desired area. The outdoor lighting system 200 also includes a connector or plug 240 at a top surface 233a of the lighting fixture 230. Optionally, according to other embodiments, a connector 240 can also be disposed at a bottom surface 233b of the lighting fixture 230.

According to one or more embodiments, the connector or plug 240 can be a NEMA® socket, two-prong or three-prong socket or any other type of connector suitable for the purposes set forth herein.

A sensor system 250 is mounted to the connector or plug 240 in accordance with one or more embodiments of the present invention. The sensor system 250 can be connected by magnetic connector or other interface unit. The details of the sensor system 250 will be described below with reference to FIG. 3.

Figure 3:
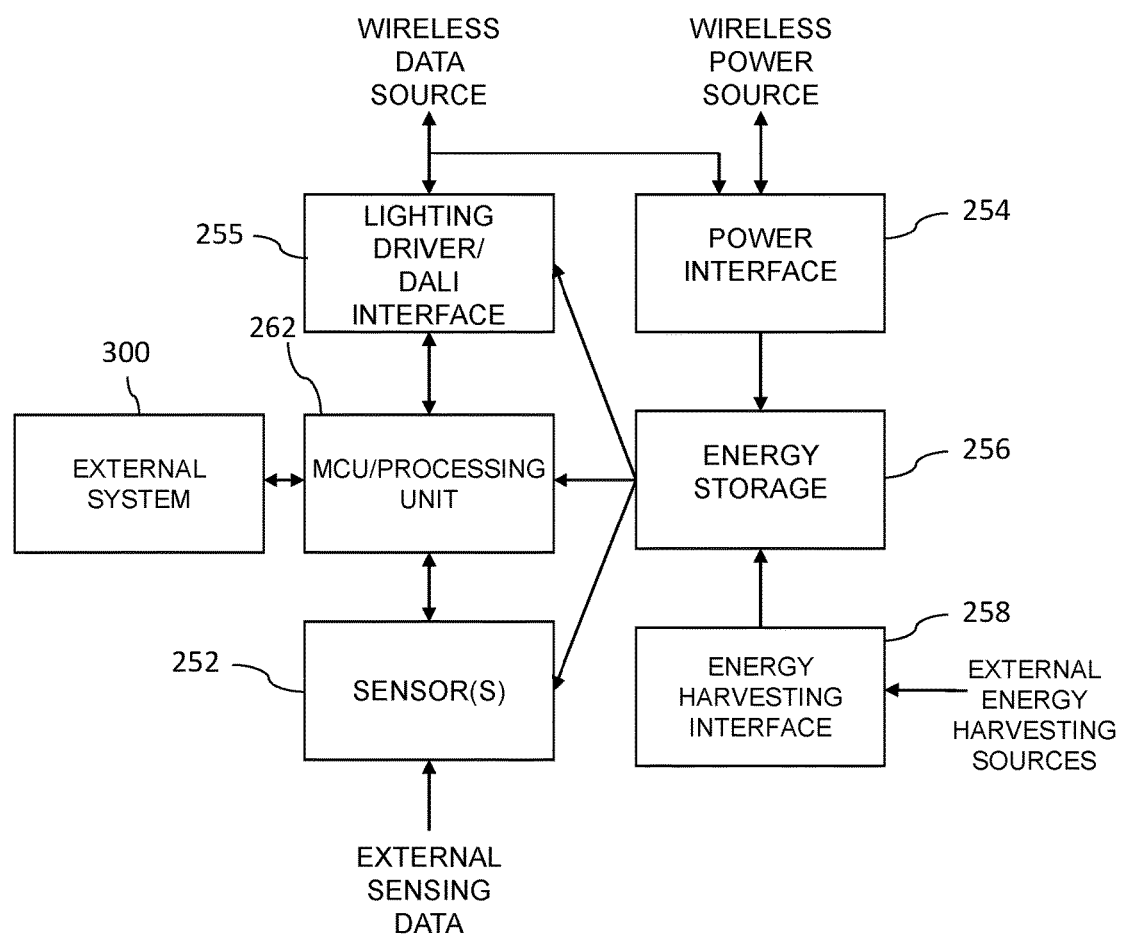
FIG. 3 is a block diagram illustrating the sensor system and the wireless data connection and power connection between the sensor system, the lighting fixture and the node shown in FIG. 2 that can be implemented within one or more embodiments of the present invention.

A node 260 including a photocell and a microcontroller/processing unit 262 (as depicted in FIG. 3) is also provided. The node 260 is disposed adjacent to a side of the sensor system 250 opposite the side of the sensor system 250 adjacent to the lighting fixture 230. That is, the sensor system 250 is sandwiched between the node 260 and the lighting fixture 230.

The photocell of the node 260 includes a photo resistor for turning the lighting device 232 on-state and off-state based on the lighting conditions. The photo resistor can include cadmium sulfide, for example, which causes the photoresistor to either conduct or resist the current. The photo resistor operates based on the presence or absence of light to activate an electromagnet switch (e.g., a relay).

The photoresistor senses the presence of light, becomes conductive, and allows the current to activate the relay that turns the lighting device 232 to an off-state during daylight hours. Without current, the photo resistor fails to conduct electricity. Consequently, the relay is deactivated and the lighting device 230 is in an on-state during low lighting conditions. The sensor system 250 can further implement lighting control based not only on controlling an on and off-state of the lighting device 232 but also the time of day, relative time to sunset or sunrise or based on information communicated from a central system and/or neighboring nodes via a predefined protocol.

As shown in FIG. 3, the sensor system 250 includes a sensor pack with one or more sensor devices 252, a power interface 254, and a lighting driver interface (e.g., a digital addressable lighting interface (DALI) interface) 255. Also included is an energy storage 256 and an energy harvesting interface 258. The sensor system 250 can also include an on-board microcontroller/processing unit, as well as an onboard GPS.

Figure 4:
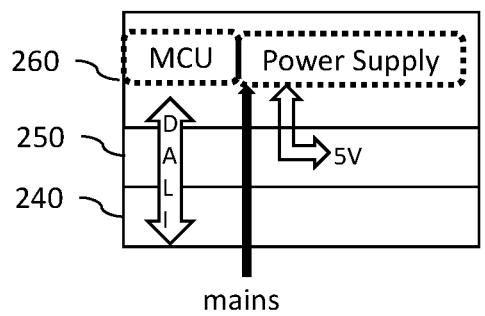
FIG. 4 is a diagram illustrating the wireless data connection and power connection between the sensor system, the lighting fixture and the node shown in FIG. 2 that can be implemented within one or more embodiments of the present invention.

As depicted in FIG. 4, the sensor system 250 connects with a mains within the lighting fixture 230 via the connector 240. The sensor system 250 receives power (e.g., 5 volts (V)) from the node 260 and is controlled by the microcontroller/processing unit 262 of the node 260. That is, in this embodiment the sensor system 250 acts as an analog peripheral to the microcontroller/processing unit 262 of the node 260.

Further, the sensor system 250 can receive power from the lighting fixture via a wireless power circuit of the lighting fixture 230.

According to the embodiments, the one or more sensors devices 252 can include a sensor for obtaining external sensing data. The sensor devices 252 include sensors for monitoring the system itself, air quality including chemical composition (e.g., CO, $CO_2$, NO, $NO_2$, $O_3$, Methane) and physical air quality including e.g., particulate matter, radiation detection, and radar, wind velocity, weather conditions, traffic conditions, and corrosion and vibration conditions. The present invention, however, is not limited to any particular sensor implementation.

As shown in FIGS. 3 and 4, the sensor devices 252 are in communication with the lighting driver (e.g., a DALI driver) of the outdoor lighting system 200, via the driver interface 255. The sensor devices 252 are therefore capable of controlling and monitoring the functions and power of the lighting device 232.

The sensor system 250 wirelessly communicates with the lighting device 232 via a wireless data source. The wireless data source can be a radio frequency (RF) source or any other type of wireless data source. If RF is used, the RF may also be the wireless power source wirelessly connecting the sensor system 250 to the lighting fixture 230. The sensor system 250 can further wirelessly communicate with the lighting fixture 230 via a designated wireless data circuit and a designated wireless power circuit of the lighting device 232 via its lighting driver 255 and its power interface 254.

Other types of wireless power sources can be used. The microcontroller/processing unit 262 is capable of wirelessly communicating, controlling sensor devices 252, managing faults, and reporting status of the sensor devices 252. According to other embodiments, the optional onboard microcontroller/processing unit of the sensor system 250 can perform these functions. The optional onboard microcontroller/processing unit can also perform filtering and smoothing of sensory data, scaling, encoding, compression of the data, local analysis of the sensory data in order to determine whether to activate the lighting device 232 of the lighting fixture 230.

The power interface 254 is configured to connect wirelessly to the power of the lighting device 230 and to the power supply of the node 260.

The sensor system 250 is further configured to harvest energy from various external energy sources such as thermal energy, vibrations, and other energy sources via the energy harvesting interface 258. The harvested energy is stored in an energy storage module 256. According to the embodiments, the sensor system 250 is therefore able to supply power to other devices, for example, to the node 260. Further the sensor system 250 can operate similar to the node 260 and further control the on-state and off-state of the lighting device 232 based on its sensory data received. Further in FIG. 4, the wireless connection between the connector 240, the sensor system 250, and the node 260 is shown. As shown, the sensor system 250 is connected to the lighting driver (e.g., the DALI driver) of the outdoor lighting system 200 to control the supply of power to the lighting device 232. The sensor system 250 is also wirelessly connected to the power supply mains of the outdoor lighting system 200. Further, the sensor system 250 can supply power to the node 260 from the energy storage module 256.

The sensor system 250 can be in wireless communication with at least one external system 300 (as depicted in FIG. 3) (e.g., a computer system) for obtaining the sensing data to monitor and control the outdoor lighting system 200. The sensor system 250 can receive command signals from the external system and transmit the sensing data in response to the command signals received. In some embodiments, the sensor system 250 controls the power and lighting functions of the lighting device 232.

Figure 5:
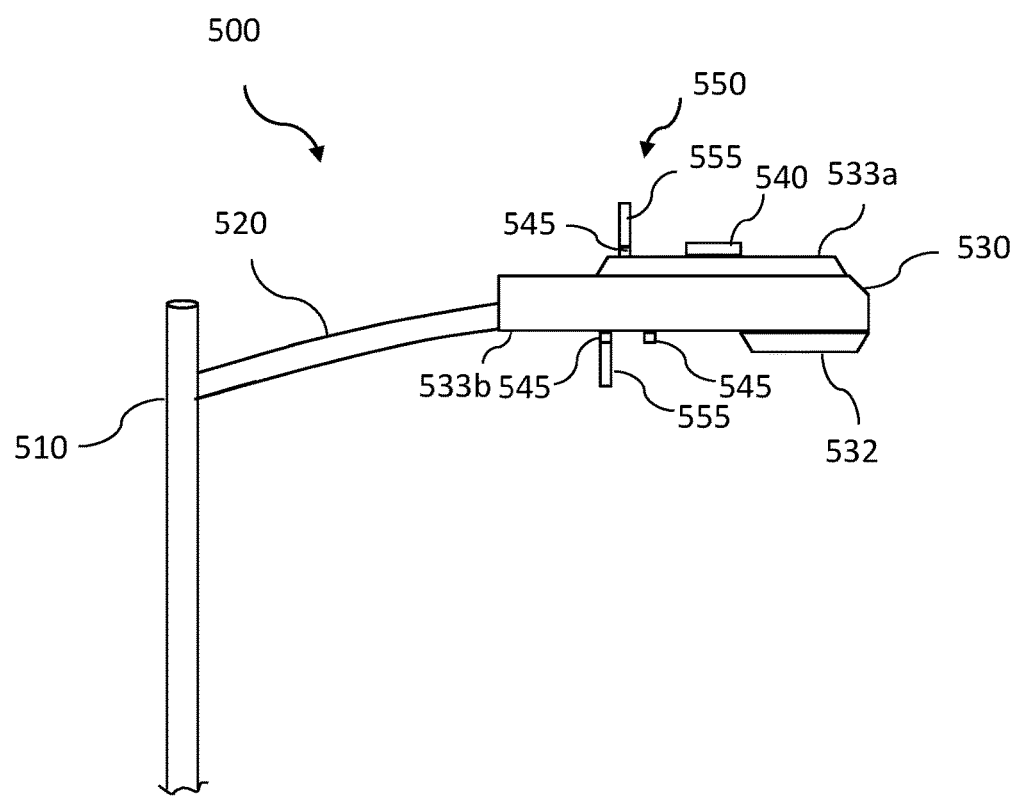
FIG. 5 is a schematic illustrating the wireless connection of a sensor system to a lighting fixture of an outdoor lighting system that can be implemented within one or more other embodiments of the present invention.
Figure 6:
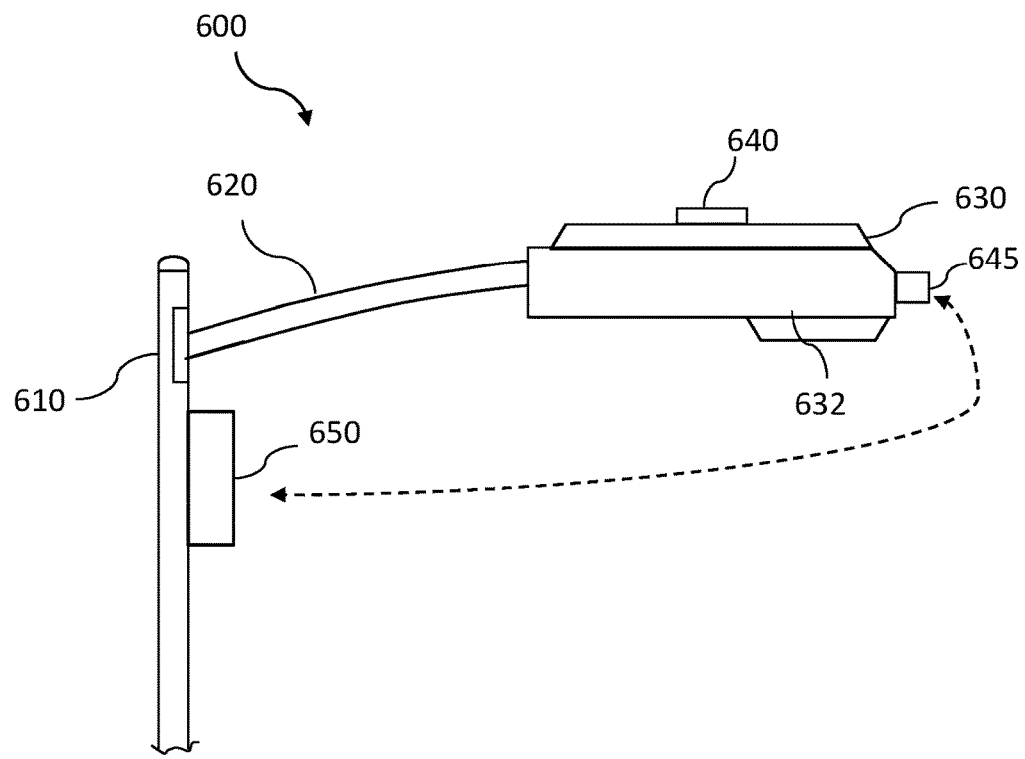
FIG. 6 is a schematic illustrating the wireless connection of a sensor system to a lighting fixture of an outdoor lighting system that can be implemented within one or more other embodiments of the present invention.

The present invention is not limited to the sensor system being implemented as shown in FIG. 2 and can be implemented in an outdoor lighting system in other ways. FIGS. 5 and 6 illustrate additional embodiments of the present invention.

In FIG. 5, the outdoor lighting system 500 includes a pole 510 attached to a proximal end of mast arm 520. A lighting fixture 530 is attached to a distal side of the mast arm 520. The lighting fixture includes a lighting device 532 and associated equipment. A connector or plug 540 is also provided. The outdoor lighting system 500 is similar to the outdoor lighting system 200 shown in FIG. 2, with the exception of a plurality of inductive wireless latches 545.

The plurality of wireless latches 545 can be disposed on a top surface 533a and a bottom surface 533b of the lighting fixture 530. The inductive wireless latches are configured to perform wireless power transfer via inductive coupling, to wirelessly transfer power from the lighting system 500 to a sensor system 550 including a plurality of sensors 555. Each sensor 555 is mounted to a respective latch 545 disposed on the lighting fixture 530. The sensor 555 can also wirelessly receive data from the lighting device 532 via the latches 545.

In FIG. 6, the outdoor lighting system 600 includes a pole 610 attached to a proximal end of mast arm 620. The mast arm 620 is also attached to a lighting fixture 630 at a distal end thereof. In this embodiment, a lighting fixture 630 includes a lighting device 632, a connector or plug 640 and a wireless communication device 645 mounted thereon. A sensor system 650 is physically mounted to the pole 610. The sensor system 650 can be mounted to the pole 610 by a magnetic connector or other interface unit.

The sensor system 650 is not connected by wires to the pole 610 or the lighting fixture 630. Instead, the sensor system 650 is only physically mounted to the pole 610 and wirelessly connected to the lighting fixture 630 as indicated by the arrow. The sensor system 650 is therefore configured to wirelessly receive data and power from the outdoor lighting system 600.

Figure 7:
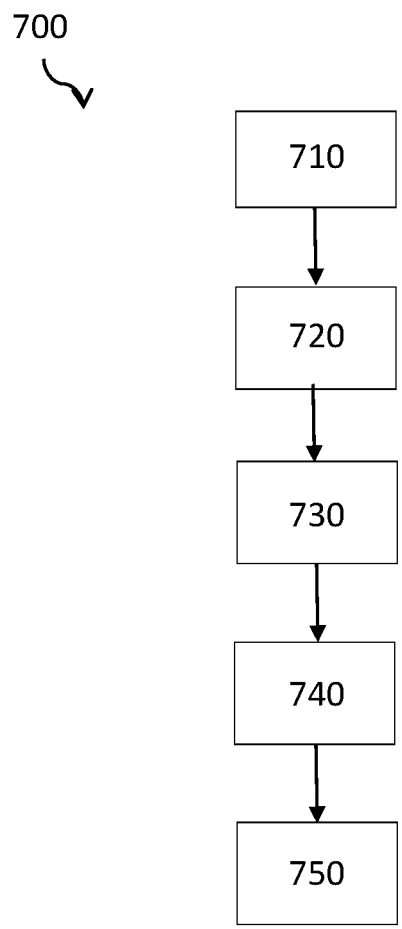
FIG. 7 is a flow chart illustrating a method of performing wireless connection between the sensor system and an outdoor lighting system that can be implemented within one or more embodiments of the present invention.

FIG. 7 is an exemplary illustration of a method 700 for performing wireless power and data connection between a sensor system and an outdoor lighting system. The method 700 begins at operation 710 where the sensor system is physically connected with a connector (FIG. 2), an inductive latch (FIG. 5) or a pole (FIG. 6).

From operation 710, the process continues to operation 720 where the sensor system is wirelessly connected to the outdoor lighting system to receive data and power from the outdoor lighting system.

From operation 720, the process continues to operation 730 where the sensors of the sensor system transmit a request signal using the microcontroller/processing unit (of the node connected thereto or onboard the sensor system) to receive the data and/or power from the outdoor lighting system. At operation 740, the outdoor lighting system receives the request signal at a microcontroller of the lighting driver and transmits the data and/or power from the outdoor lighting system to the sensor system as requested.

At operation 750, the sensor system can further send the information requested to an external system for monitoring purposes upon request. The sensor system can also receive command signals from the external system to control the outdoor lighting system. The external system may request information regarding the traffic conditions, weather conditions and current power and lighting conditions of the outdoor lighting system and send command signals to adjust the lighting of the lighting device based on the information received.

This written description uses examples to disclose the invention including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sensor system for an outdoor lighting system comprising a lighting fixture and an external connector disposed on the lighting fixture, the sensor system comprising:
   at least one sensor physically connected with the external connector and configured to perform (i) sensing, and (ii) wireless data and power connection, via a wireless power source and a wireless data source, with the outdoor lighting system;
   wherein the outdoor lighting system further includes a node for controlling power to the outdoor lighting system, and wherein the sensor system is disposed between the node and the external connector.

2. The sensor system of claim 1, further comprising:
a power interface configured to receive power from the outdoor lighting system via the wireless power source;
a data interface configured to receive data from the outdoor lighting system via the wireless data source.

3. The sensor system of claim 2, further comprising a processing unit configured to:
(i) perform wireless communication with a processing unit of a lighting driver of the outdoor lighting system, using a processing unit of the node,
(ii) control the at least one sensor, and
(iii) perform fault management and status reporting of the at least one sensor.

4. The sensor system of claim 3, wherein the power interface is further configured to wirelessly connect the sensor system to a power supply of the node.

5. The sensor system of claim 3, further comprising:
an energy harvesting interface configured to harvest energy from an external energy source; and
an energy storage configured to receive the harvested energy from the energy harvesting interface and store the energy for use by the sensor system.

6. The sensor system of claim 3, wherein the processing unit is further configured to communicate with an external system for obtaining sensing data to monitor and control the outdoor lighting system, wherein the processing unit of the node is configured to receive at least one command signal from the external system, and transmit the sensing data in response to the at least one command signal received.

7. The sensor system of claim 6, wherein the processing unit is further configured to send at least one control signal to the processing unit of the lighting driver to control the power and data of the outdoor lighting system.

8. The sensor system of claim 1, wherein the wireless power source and the wireless data source is an RF source.

9. A sensor system for an outdoor lighting system including a lighting fixture, the sensor system comprising:
at least one sensor;
a wireless source connector connected to the lighting fixture, wherein the at least one sensor is configured to: (i) perform sensing, and (ii) perform wireless data and power connection, via the wireless source connector, with the outdoor lighting system; and
a processing unit configured to: (i) perform wireless communication with a processing unit of a lighting driver of the outdoor lighting system, (ii) control the at least one sensor, and (iii) perform fault management and status reporting of the at least one sensor.

10. The sensor system of claim 9, further comprising:
an energy harvesting interface configured to harvest energy from an external energy source; and
an energy storage configured to receive the harvested energy from the energy harvesting interface and store the energy for use by the sensor system.

11. The sensor system of claim 9, wherein the processing unit is further configured to communicate with an external system, for obtaining sensing data to monitor and control the outdoor lighting system, and wherein the processing unit of the sensor system is configured to receive at least one command signal from the external system, and transmit the sensing data in response to the at least one command signal received.

12. The sensor system of claim 11, wherein the processing unit is further configured to send at least one control signal to the processing unit of the lighting driver to control the power and data of the outdoor lighting system.

\* \* \* \* \*